(12) United States Patent
Machac, Jr. et al.

(10) Patent No.: US 6,833,341 B2
(45) Date of Patent: Dec. 21, 2004

(54) PAINT STRIPPING COMPOSITIONS

(75) Inventors: James R. Machac, Jr., Lago Vista, TX (US); Edward T. Marquis, Austin, TX (US); Susan A. Woodrum, Round Rock, TX (US)

(73) Assignee: Huntsman Petrochemical Corporation, Austin, TX (US)

( * ) Notice: Subject to any disclaimer, the term of this patent is extended or adjusted under 35 U.S.C. 154(b) by 287 days.

(21) Appl. No.: 10/223,867

(22) Filed: Aug. 20, 2002

(65) Prior Publication Data

US 2003/0119686 A1 Jun. 26, 2003

Related U.S. Application Data

(62) Division of application No. 09/654,439, filed on Sep. 1, 2000, now Pat. No. 6,479,445, which is a continuation-in-part of application No. 09/459,073, filed on Dec. 10, 1999, now Pat. No. 6,239,090, which is a continuation-in-part of application No. 09/417,137, filed on Oct. 12, 1999, now Pat. No. 6,162,776, which is a continuation of application No. 09/083,402, filed on May 22, 1998, now Pat. No. 6,040,284.
(60) Provisional application No. 60/047,529, filed on May 23, 1997, and provisional application No. 60/048,450, filed on Jun. 3, 1997.

(51) Int. Cl.[7] .............................. C09D 9/00; C11D 7/18; C11D 7/50
(52) U.S. Cl. ..................... 510/202; 510/201; 510/206; 510/212; 510/405; 510/407; 510/432; 134/38; 134/40
(58) Field of Search ................... 510/201, 202, 510/206, 212, 405, 407, 432; 134/38, 40

(56) References Cited

U.S. PATENT DOCUMENTS

| | | |
|---|---|---|
| 3,355,385 A | 11/1967 | Mackley |
| 3,843,578 A | 10/1974 | Logemann et al. |
| 3,925,008 A | 12/1975 | Makino et al. |
| 3,954,648 A | 5/1976 | Belcak et al. |
| 4,508,634 A | 4/1985 | Elepano et al. |
| 4,561,898 A | 12/1985 | Fehr et al. |
| 4,594,111 A | 6/1986 | Coonan |
| 4,927,556 A | 5/1990 | Pokorny |
| 4,956,115 A | 9/1990 | Van De Mark |
| 5,006,279 A | 4/1991 | Grobbel et al. |
| 5,085,795 A | 2/1992 | Narayanan et al. |
| 5,098,591 A | 3/1992 | Stevens |
| 5,098,594 A | 3/1992 | Doscher |
| 5,106,525 A | 4/1992 | Sullivan |
| 5,179,224 A | 1/1993 | Takaki et al. |
| 5,215,675 A | 6/1993 | Wilkins et al. |
| 5,331,103 A | 7/1994 | Costantini et al. |
| 5,334,331 A | 8/1994 | Fusiak |
| 5,414,153 A | 5/1995 | Costantini et al. |
| 5,425,893 A * | 6/1995 | Stevens .................. 134/1 |
| 5,427,710 A | 6/1995 | Stevens |
| 5,585,526 A | 12/1996 | Costantini et al. |
| 5,597,788 A | 1/1997 | Stevens |
| 5,721,204 A | 2/1998 | Maxwell et al. |
| 5,728,666 A | 3/1998 | Vitomir |
| 5,759,975 A | 6/1998 | Maxwell |
| 6,040,284 A | 3/2000 | Marquis et al. |
| 6,162,776 A | 12/2000 | Marquis et al. |
| 6,169,061 B1 * | 1/2001 | Machac et al. ............ 510/201 |
| 6,239,090 B1 * | 5/2001 | Marquis et al. ............ 510/201 |
| 6,369,009 B1 * | 4/2002 | Machac et al. ............ 510/201 |
| 6,479,445 B1 * | 11/2002 | Machac et al. ............ 510/206 |
| 6,586,380 B2 * | 7/2003 | Marquis et al. ............ 510/201 |

FOREIGN PATENT DOCUMENTS

WO  WO97/29158  8/1997

OTHER PUBLICATIONS

International Search Report, Sep. 4, 1998.

* cited by examiner

*Primary Examiner*—Gregory Webb
(74) *Attorney, Agent, or Firm*—O'Keefe, Egan & Peterman LLP

(57) ABSTRACT

This invention concerns a composition useful as a paint remover, comprising: an organic carbonate, an alcohol, an activator, hydrogen peroxide, and water. The alcohol may be benzyl alcohol. The organic carbonate may be propylene carbonate, ethylene carbonate, or combination thereof. The activator may be an alkyl-substituted cycloalkane (naphthene), a soy oil, an alkyl soyate, or combination thereof.

13 Claims, No Drawings

PAINT STRIPPING COMPOSITIONS

This application is a divisional of application Ser. No. 09/654,439 filed Sep. 1, 2000, now U.S. Pat. No. 6,479,445, which is a continuation-in-part of U.S. application Ser. No. 09/459,013, filed Dec. 10, 1999 now U.S. Pat. No. 6,239,090, which is a continuation-in-part of U.S. application Ser. No. 09/417,137, filed Oct. 12, 1999, now U.S. Pat. No. 6,162,776, which is a continuation of U.S. Ser. No. 09/083,402, filed May 22, 1998, now U.S. Pat. No. 6,040,284, which claims priority to U.S. provisional application Ser. No. 60/047,529, filed May 23, 1997 and U.S. provisional Ser. No. 60/048,450, filed Jun. 3, 1997.

BACKGROUND OF INVENTION

This invention relates to compositions for paint and coating removal. More particularly, this invention relates to compositions containing hydrogen peroxide, water, and an organic carbonate, such as propylene carbonate, and optionally an activator and an alcohol.

Paint removing compositions are commonly used in industry, such as for stripping paint from airplane fuselages. Conventional paint remover compositions include methylene chloride, phenol, or caustic. Each of these materials, however, has inherent problems during use. While methylene chloride based compositions are very effective as paint removers, methylene chloride is a highly volatile material which is considered toxic. Similarly, phenol is highly toxic. Furthermore, caustic causes burns and attacks aluminum. Due to the deficiencies and disadvantages of conventional paint removing compositions, new paint removing compositions are highly desirable.

SUMMARY OF INVENTION

The present invention provides a solution to one or more of the disadvantages and deficiencies described above.

In one broad respect, this invention is a composition useful as a paint remover, comprising: an organic carbonate, hydrogen peroxide, and water. This composition, in another broad respect, is composition useful as a paint remover, comprising: an organic carbonate, an alcohol, an activator, hydrogen peroxide, and water. Representative examples of such activators include vegetable oils, naphthene, and alkyl soyate, which can improve the performance of the composition in some paint stripping applications. A representative example of an alcohol that may be used in this composition is benzyl alcohol ($C_6H_5CH_2OH$). In another broad respect, this invention is a process for manufacture of a paint remover, comprising: combining effective amounts an organic carbonate, an activator, an alcohol, hydrogen peroxide, and water to form a miscible composition.

In another broad respect, this invention is a process for removing paint, comprising: applying a composition containing an organic carbonate, hydrogen peroxide, and water to a painted surface for a time and under conditions effective to cause blistering or bubbling of the paint. In another broad respect, this invention is a process for removing paint, comprising: applying a composition a painted surface for a time and under conditions effective to cause blistering or bubbling of the paint, wherein the composition comprises effective amounts of an organic carbonate, an activator, an alcohol, hydrogen peroxide, and water.

In another broad respect, this invention is a composition useful as a paint remover, comprising: effective amounts of an organic carbonate, a thickener, hydrogen peroxide, and water. This composition may also include an activator and an alcohol. This composition may optionally contain a thickener such as a polyvinyl pyrrolidone thickener. Likewise, the composition may include a compatibilizer such as a glycol ether. As used herein, the phrase "effective amount" means an amount of a given component, or combination of given components, that is component effective to provide a composition capable of removing at least a portion of the paint from a painted surface. A variety of amounts will be effective in the practice of this invention. Routine experimentation by testing compositions as paint removers is all that is needed to determine effective amounts.

In another broad respect, this invention is a process for removing paint, comprising: applying a composition containing effective amounts of (a) an organic carbonate, (b) a thickener, (c) hydrogen peroxide and (d) water to a painted surface for a time and under conditions effective to cause blistering or bubbling of the paint. This composition may also include an activator and an alcohol.

The surfaces to be treated may be sealed with a variety of sealants, such as polysulfide, polyurethane, lacquer, epoxy, and the like. The compositions can be used to remove paints and coatings from furniture, automobiles, boats, trains, airplanes, military vehicles, and so forth.

This invention has a number of advantages. For example, the compositions have several important attributes, including low toxicity, high efficacy in removing paint and coatings, and neutral pH (or slightly acidic or slightly basic pH). Furthermore, in the case of propylene carbonate, the propylene carbonate breaks down into propylene glycol, which is non-toxic. Likewise, hydrogen peroxide decomposes over time to water. Hence, the propylene carbonate compositions of this invention are environmentally friendly, particularly as compared to chlorinated hydrocarbons and the like which are commonly used for paint and coating removing. In addition, the compositions of this invention cause blistering and bubbling in such a short period of time that it is envisioned that the compositions of this invention might be applied in liquid form, as opposed to the gels which are commonly applied which lesson evaporation of the chlorinated hydrocarbons, for example. Moreover, the PVP thickened compositions of this invention are peroxide stable, retain their viscosity over time, and provide clean, miscible, solutions free of phase separation, cloudiness, or flocculation. It was surprisingly found that the PVP thickeners provided superior results compared to many other types of thickeners. In particular, the PVP-thickened compositions were unique in providing clear, stable compositions. Other thickeners such as the polyacrylic acid types formed "clumps" and would not disperse in the formulations. Still others, such as the Klucel® type, have now been found to thicken initially but then decrease in viscosity sharply with time on standing.

It has further been advantageously found that by employing hydrogen peroxide in the form of an at least 50% aqueous solution, a miscible solution forms with alkylene carbonate. In the context of this invention, by miscible solution it is meant a single phase solution. The resulting composition has surprisingly superior paint removing properties, which is believed to be due to the limited amount of water present. The compositions may be blended with additional cosolvents, activators, corrosion inhibitors, and the like, or may be used directly to effect paint removal. The compositions of this invention may advantageously be nonflammable, of low volatility and free of carcinogenic chemicals.

DETAILED DESCRIPTION OF THE INVENTION

The compositions of this invention contain an organic carbonate, hydrogen peroxide, and water. This composition may also include an activator and an alcohol. The composition may also include a thickener. Likewise, the composition may include one or more compatibilizer or a co-solvents.

The hydrogen peroxide and water can be conveniently obtained from commercial sources as aqueous hydrogen peroxide solutions of varying percentages. Hydrogen peroxide is commonly available in aqueous solutions at a concentration of from about 1 to about 80 percent. For example, industrial solutions are often 30 percent or more by weight hydrogen peroxide solutions. It has been found that in the practice of this invention, the use of a 50% aqueous hydrogen peroxide solution is particularly effective. It may be appreciated that highly concentrated hydrogen peroxide should be handled carefully and appropriately since such materials are considered strong oxidizers. It may also be noted that once the concentrated hydrogen peroxide solution is admixed with carbonate, the concentration of hydrogen peroxide decreases which thus reduces the hazardous nature of the final composition. For example, when the overall concentration of hydrogen peroxide in the admixed composition is less than about 30%, special precautions need not be taken to handle the composition. Use of an aqueous hydrogen peroxide solution having a concentration of from about 30% to about 50% is preferred in the practice of this invention. In this regard, it should be appreciated that a lower hydrogen peroxide concentration of the aqueous solution may require use of cosolvents, surfactants, or the like to provide a miscible final composition.

In one embodiment of this invention, the amount of hydrogen peroxide in the total composition is at least 4 percent by weight. In another embodiment, the amount of hydrogen peroxide in the total composition is at least 10 percent by weight. In another embodiment of this invention, the amount of hydrogen peroxide is at least 15 percent by weight of the total composition or, alternatively, at least 35 percent by weight. The composition may be diluted. If diluted, the final peroxide amount is preferably in the range from about 3 percent by weight to about 9 percent by weight.

The organic carbonate used in the practice may be an alkylene carbonate, a dialkyl carbonate, or combination thereof. More than one alkylene or dialkyl carbonate or combination thereof may be employed, such as use of both ethylene and propylene carbonate or ethylene or propylene carbonate and dimethyl carbonate. It should be appreciated that the alkylene carbonates are cyclic carbonates. In general, the amount of carbonate in the thickened compositions may vary from about 0.1% to about 90%. Typically, the amount of the carbonate is in the range from about 25% to about 75%. In one embodiment, the amount of the carbonate is in the range from about 40% to about 50% of the total composition. In another embodiment, the carbonate is present in amount of at least about 20% by weight. In another embodiment, the amount of carbonate is greater than 50% by weight.

Concentrated compositions may range from about 8 to about 15 percent peroxide with the balance being water and dialkyl carbonate or dialkyl carbonate and alkylene carbonate.

The alkylene carbonate used in the present invention can contain from 2 to 10 carbon atoms. Representative examples of alkylene carbonates that may be employed in the practice of this invention include ethylene carbonate and propylene carbonate. In the practice of this invention, propylene carbonate is preferred.

The dialkyl carbonate used in the present invention may contain from 3 to 25 carbon atoms. The dialkyl carbonate may be of formula R—CO$_3$—R', wherein R and R' may be the same or different, and may independently in each occurrence be alkyl of from 1 to about 12 carbon atoms. In one embodiment, the dialkyl carbonate may be dimethyl carbonate, diethyl carbonate, or a mixture thereof.

Vegetable oils may be used in the compositions disclosed herein, particularly soybean oil. Soybean oil has the advantage of being a abundant and relatively inexpensive vegetable oil. Other oils that may be employed include cottonseed oil, oil from nuts such as peanuts, sunflower seed oil, rape seed oil, coconut oil, flaxseed (linseed) oil, sesame seed oil, palm kernel oil, and safflower seed oil. As used herein, "soy oil" and "soybean oil" refer to natural oil extracted from whole soybeans. Soy oil, preferred in the practice of this invention, is low in saturated fat, contains no protein, and principally contains oleic acid and linoleic acid.

The amount of vegetable oil used in the practice of this invention may vary widely. In general, the amount of vegetable oil may be from about 0.1 percent by weight to about 90 percent by weight, more typically up to about 50 percent by weight. In one embodiment of this invention, the vegetable oil is present in an amount in the range from about 0.1 to about 5 percent by weight of the total composition. It may be appreciated that at higher loadings (for example, above about 5 percent) of vegetable oil, a compatibilizer may be needed to form a miscible solution.

The alkyl-substituted cycloalkanes may include naphthenes. The naphthenes that may employed in the practice of this invention may vary widely. Generally, as used herein, naphthene refers to a cycloalkane that contains 5 to 9 carbon atoms per molecule. Representative, non-limiting examples of such cycloalkanes that may be used in the practice of this invention include cyclopentane, cyclohexane, methylcyclopentane, cycloheptane, 1,1-dimethylcyclopentane, 1,2-dimethylcyclopentane, 1,3-dimethylcyclopentane, ethylcyclopentane, n-propylcyclopentane, methylcyclohexane, 1,1-dimethylcyclohexane, 1,2-dimethylcyclohexane, 1,3-dimethylcyclohexane, ethylcyclohexane, cyclooctane, mixtures thereof, and the like. As used herein, naphthenes may also be referred to as alkyl-substituted cyclo-alkanes.

The amount of alkyl-substituted cycloalkane used in the practice of this invention may vary widely. In general, the amount of alkyl-substituted cycloalkane may be from about 0.1 percent by weight to about 90 percent by weight, more typically in the range from about 5 to about 50 percent by weight. In one embodiment of this invention, the alkyl-substituted cycloalkane is present in an amount in the range from 15 to about 45 percent by weight of the total composition. In another embodiment, the amount of alkyl-substituted cycloalkane is in the range from about 20 to about 45 percent.

In the compositions containing an alkyl-substituted cycloalkane or vegetable oil, an alkyl soyates such as methyl soyate can be employed to function as an activator. While the alkyl soyates may function as a compatibilizer in some instances, in compositions containing alkyl-substituted cyclo-alkanes, the soyate serves as an activator. An alkyl soyate is an alkyl ester derived from the fatty acids such as oleic acid and linoleic acid that are present in soybean oil. Methyl soyate may also be referred to as a soy methyl ester (CAS No. 67784-80-9).

The amount of alkyl soyate used in the practice of this invention may vary widely. Typically the total amount of alkyl soyate compound is from about 0.1 to about 50 percent by weight of the total composition. In one embodiment, the amount is up to about 40 percent by weight. In one embodiment when using an alkyl-substituted cyclo-alkane, the amount may be from about 0.1 to about 5 percent by weight. However, in other embodiments, the amount may be in the range from about 10 to about 30 percent by weight.

The compositions of this invention may optionally include an alcohol. Representative examples of such alcohols include methanol, ethanol, propanol, butanol, and benzyl alcohol. In the practice of this invention, benzyl alcohol is preferred. Generally, compositions of this invention contain from 0 to about 90 percent by weight alcohol. For the removal of certain types of coatings, it has been found the efficiency of the carbonate, hydrogen peroxide water solution may be improved by the addition of an alcohol.

The lactates that may employed in the practice of this invention, which may also be added as a compatibilizer, may vary widely. The lactates that may be used in the practice of this invention typically contain up to about 20 carbons. The lactates used in the practice of this invention generally include esters of lactic acid, such as methyl lactate, ethyl lactate, propyl lactate, butyl lactate, isopropyl lactate, isobutyl lactate or the like, or mixtures thereof.

The amount of lactate used in the practice of this invention may vary widely. Typically the total amount of lactate compound is from about 0.1 to about 50 percent by weight of the total composition. In one embodiment, the amount is from about 5 to about 40 percent by weight. In another embodiment, the amount is in the range from about 10 to about 30 percent by weight.

In addition to the components described above, it is contemplated that the compositions of this invention may optionally contain other activators such as formic or oxalic acid, thickeners, glycol ethers such as propylene glycol methyl ether (PM), dipropylene glycol methyl ether (DPM), or dipropylene glycol n-butyl ether (DPNB), surfactants, acids or bases, stabilizers, corrosion inhibitors, and other additives commonly used in paint removers.

PVP is particularly preferred as the thickener in the practice of this invention. Polyvinyl pyrrolidone (PVP) is a well known polymer with well known methods of manufacture. Polyvinyl pyrrolidone is available commercially in a variety of molecular weights. The PVP may be substituted with a variety of groups. The amount of PVP employed is an amount sufficient to provide a thickened composition having a viscosity in the range from about 500 centipoise to about 5,000 centipoise, preferably from about 1,000 centipoise to about 2,000 centipoise. The PVP amount needed to achieve these viscosities will vary depending on the type of PVP employed. In general, the amount of thickener may be in the range from about 1 to about 50 percent by weight of the total composition, more typically from about 5 to about 25 percent, and in one embodiment from about 5 to about 20 percent. In one embodiment, the polyvinyl pyrrolidone is present in an amount up to about 10 percent by weight of the composition.

In certain embodiments of this invention, the compositions contain from about 10 to about 90 percent by weight of the carbonate, from about 0.1 to about 10 percent PVP thickener, from about 0.1 to about 20 percent by weight hydrogen peroxide, and from about 0.1 to about 30 percent water.

Non-limiting examples of representative thickeners include cellulose ethers such hydroxypropyl cellulose, ethyl cellulose, ethyl hydroxyethyl cellulose, methyl cellulose, and other alkyl or hydroxy alkyl cellulose; silica including colloidal silica; clays such as bentonite and montmorillonite starch; alumina including colloidal alumina; gum arabic; tragacanth; agar; sugar derivatives; high molecular weight polyethylene oxides; guar gum; xanthan gum; polyvinyl pyrrolidone and methyl vinyl ether/maleic anhydride copolymers. It has been found that certain hydroxy alkyl cellulose ethers and certain experimental polymers are particularly effective and resistant to breakdown in the practice of this invention. Such cellulose ethers are available commercially from The Dow Chemical Company under the trade name Methocal® F4MPRG and Dow's Experimental Polymer SCS 41067.06. Another preferred thickener in the practice of this invention is polyvinyl pyrrolidone (PVP). When a thickener is used, the amount of such thickener can vary depending on the desired level of thickening for the given application. In general, the amount of thickener employed is about 1 to about 4 percent by weight.

Non-limiting examples of representative corrosion inhibitors include ethoxylated butynediol, petroleum sulfonates, blends of propargyl alcohol and thiourea. If used, the amount of such corrosion inhibitors is typically up to about 10% by weight of the total composition.

Chelating agents may also be added to the composition of this invention to complex with metal ions which may cause degradation of the peroxide. When used, chelating agents may be used in an amount up to about 10% by weight of the total composition. Representative examples of such chelating agents include, but are not limited to, ethylene diamine tetraacetic acid (EDTA) and its metal salts, diethylene triamine pentaacetic acid, polyphosphates and phosphonic acids, and the like.

Non-limiting examples of representative surfactants which may optionally be used in the practice of this invention include non-ionic, anionic, cationic and amphoteric surfactants, such as monocarboxyl cocoimidoazoline, higher alkyl sulfate sodium salts, tridecyloxy poly(alkyleneoxy ethanol), ethoxylated or propoxylated alkyl phenol, alkyl sulfoamides, $C_{10-18}$ alkaryl sulfonates such as alkylbenzene sulfonates, cocoamphaodipropionate, cetylpalmitic alkanol amides, hydrogenated castor oil, isooctylphenyl polyethoxy ethanol, sorbitan monopalmitate, $C_{8-18}$ alkyl pyrrolidone, cocoaminopropionic acid and polyethoxy amino salts thereof. When used, the amount of surfactant should be sufficient to render the composition miscible. Typically the amount of surfactant is from about 0.1 to about 10 percent by weight of the total composition.

The compositions of this invention may also optionally contain a wide variety of other organic cosolvents. Likewise, the present invention may be practiced in the absence of one or more of such solvents. Non-limiting examples of representative classes of such other cosolvents include hydrocarbons apart from the alkyl-substituted cycloalkanes, glycols, glycol ethers, glycol ether esters, ethers, esters, phenols, glycols, sulfur-based solvents, chlorinated hydrocarbons, aromatic hydrocarbons nitrated hydrocarbons, amides, and ketones. Such cosolvents may be polar or non-polar, may be protic or aprotic, may be cyclic, branched, or straight-chain, and may contain one or more functional groups. Representative examples of common hydrocarbon solvents include hexane, toluene, xylene, and mixtures of aliphatic and aromatic hydrocarbons. Representative examples of common ether solvents include dibutyl ether, ethyl ether, and diphenyl ether. Representative examples of common ester solvents and lactones include material such as butyrolactone, ethyl acetate, butyl acetate, DBE (dibasic ester mixture from DuPont). Representative examples of common phenols include phenol and the cresols and resorinols. Representative examples of common glycol solvents include ethylene, propylene and butylene glycols as well as methyl propane diol. Representative examples of common sulfur-based solvents include dimethylsulfoxide (DMSO) and sulfolane. Representative examples of common chlorinated hydrocarbon solvents include methylene chloride, methyl chloroform, chlorobenzenes and dichlorobenzenes. Representative examples of common nitrated hydrocarbon solvents include nitroethane and nitropropane. Representative examples of common amide solvents include formamide, dimethyl formamide, acetamide, and dimethylacetamide. Representative examples of common ketone solvents include acetone, methyl ethyl ketone (MEK), and methyl isobutyl ketone and methyl isoamylbutone.

When a given composition containing the carbonate does not form a miscible composition, a co-solvent may be used to provide a miscible composition. For instance, a glycol ether may be added as a co-solvent in an amount effective to solubilize the components of the mixture. Such glycol ethers may be included for other purposes as well. Such amounts may vary depending on the specific composition of interest, as one of skill in the art may appreciate. The particular type and amount of glycol ether which will afford a miscible composition may be identified by routine experimentation. Typically, the amount of glycol ether employed is less than about 90 percent by weight, and more typically from about 10 percent to about 50 percent. Also, an alcohol or alkylene carbonate may be beneficially employed as a co-solvent to provide miscible dialkyl carbonate compositions of this invention.

The conditions under which the paint stripping process of this invention may be practiced may vary. Typically, the process will be conducted under ambient atmospheric conditions. Temperatures from 0° F. to about 125° F., although higher temperatures may be used. The paint remover composition may be applied by any convenient method such as by dipping, spraying, or brushing the composition onto the paint surface. For resistant painted surfaces it may be desirable to apply the composition two or more times to fully separate the paint from the surface. It may be desirable to use a rag, scraper, sand blaster, or the like to fully remove paint chips from the surface after the paint remover composition has been given time to fully act. Alternatively, high pressure water spray may be employed to remove paint chips and residual paint remover composition. It may be appreciated that the time required for the paint remover composition to act will vary due to a variety of factors such as temperature, paint type, and particular paint remover formulation being used. In general, application times are between one minute and one hour, although longer application times may be used.

In the practice of this invention, it is contemplated that a thickener may be admixed into a stripping composition just prior to use. This is particularly desirable if thickeners are employed which are not stable in the hydrogen peroxide compositions for extended periods of time. Admixing may be effected by standard techniques, such as stirring agitation, and rolling. The particular mixing method must be tailored to the specific system being thickened. Likewise, the order or rate of addition of thickener and any other additives or components must be tailored to the specific solvent combination involved. Advantageously, the PVP thickened compositions may be made and stored for extended periods of time.

The following examples are illustrative of this invention and are not intended to be limit the scope of the invention or claims hereto. Unless otherwise denoted all percentages are by weight. In the tables, "N/A" denotes "not available."

EXAMPLE 1
Propylene Carbonate Composition

Various compositions were prepared containing propylene carbonate, as indicated in Table 1. In Table 1, the values for benzyl alcohol, propylene carbonate, formic acid, hydrogen peroxide, and water are based on weight percentages. The benzyl alcohol is an optionally included co-solvent. The hydrogen peroxide was delivered from a 30% aqueous solution. The compositions were applied to a standard aluminum panel having paint and coatings for military use (obtained from Scientific Material International, Inc. of Miami, Fla., Lot 96046-A2 4"×5", MIL-P-2337 primer, MIL-S-81733 Type 3 polysulfide sealant, MIL-C-83286), and allowed to sit on the panels. The propylene carbonate/hydrogen peroxide/water compositions was surprisingly effective in removing the paint and coatings. In Table 1, the runs in which hydrogen peroxide or propylene carbonate are lacking are not representative of the invention, and are presented for purposes of comparison only. Bubbling and blistering were observed by visual inspection.

The compositions have several important attributes, including low toxicity, high efficacy in removing paint and coatings, and neutral pH (or slightly acidic or slightly basic pH). Furthermore, propylene carbonate breaks down into propylene glycol, which is non-toxic, and hydrogen peroxide decomposes to water. Hence, the propylene carbonate compositions of this invention are environmentally friendly, particularly as compared to chlorinated hydrocarbons and the like which are commonly used for paint and coating removing. In addition, the compositions of this invention cause blistering and bubbling in such a short period of time that it is envisioned that the compositions of this invention can be applied in liquid form, as opposed to the gels which are commonly applied which lesson evaporation of the chlorinated hydrocarbons, for example. However, on difficult to remove coatings on vertical surfaces, thickeners such as Klucel H (Hercules, Aqualon Division), Dow's Methocell® F4MPRG or Dow's experimental polymer XCS 41067.06 may be required to obtain effective coating removal.

TABLE 1

| Benzyl Alcohol | Propylene Carbonate | Formic Acid | Hydrogen peroxide | Water | Minutes to Blister | Minutes to Bubble |
| --- | --- | --- | --- | --- | --- | --- |
| 60 | 40 | 0 | 0 | 0 | 720* | N/A |
| 58.2 | 38.8 | 3 | 0 | 0 | N/A | 360* |
| 56.4 | 37.6 | 6 | 0 | 0 | N/A | 345* |
|  | 80 | 0 | 6 | 14 | 24 | 64 |
| 54 | 36 | 0 | 3 | 7 | 32 | 44 |
| 48 | 32 | 0 | 6 | 14 | 20 | 35 |
| 40 | 40 | 0 | 6 | 14 | 20 | 28 |
| 30 | 50 | 0 | 6 | 14 | 25 | 33 |
| 20 | 60 | 0 | 6 | 14 | 31 | 38 |
| 80 | 0 | 0 | 6 | 14 | Immiscible, 2 phases* | |

The "*" denotes experiments that are not representative of this invention, and are presented for comparison only.

EXAMPLE 2
Ethylene Carbonate Composition

Various compositions were prepared containing ethylene carbonate, as indicated in Table 2. In Table 2, the values for benzyl alcohol, ethylene carbonate, formic acid, hydrogen peroxide, and water are based on weight percentages. As in Example 1, the compositions were applied to a standard panel having paint and coatings for military use (obtained from Scientific Material International, Inc., Lot 96046-A2 4"×5", MIL-P-2337 primer, MIL-S-81733 Type 3 polysulfide sealant, MIL-C-83286). The ethylene carbonate/benzyl alcohol/hydrogen peroxide/water compositions were surprisingly effective in removing the paint and coatings. In Table 2, the runs in which hydrogen peroxide or ethylene carbonate are lacking are not representative of the invention, and are presented for purposes of comparison only.

The compositions have several important attributes, including low toxicity, high efficacy in removing paint and coatings, and neutral pH (or slightly acidic or slightly basic pH). In addition, the compositions of this invention cause blistering and bubbling in such a short period of time that it is envisioned that the compositions of this invention can be applied in liquid form, as opposed to the gels which are commonly applied which lesson evaporation of the chlorinated hydrocarbons, for example. However, on difficult to remove coatings on vertical surfaces, thickeners such as Klucel H (Hercules, Aqualon Division) or Dow's Methocal® F4MPRG or Dow's experimental polymer XCS 41067.006 may be required to obtain effective coating removal.

TABLE 2

| Benzyl Alcohol | Ethylene Carbonate | Formic Acid | Hydrogen peroxide | Water | Minutes to Blister | Minutes to Bubble |
|---|---|---|---|---|---|---|
| 60 | 40 | 0 | 0 | 0 | >150* | N/A |
| 58.2 | 38.8 | 3 | 0 | 0 | 100* | >150* |
| 56.4 | 37.6 | 6 | 0 | 0 | 41* | >150* |
| 54 | 36 | 0 | 3 | 7 | 30 | 36 |
| 45 | 45 | 0 | 3 | 7 | 33 | 40 |
| 48 | 32 | 0 | 6 | 14 | 20 | 30 |
| 40 | 40 | 0 | 6 | 14 | 25 | 35 |
| 42 | 28 | 0 | 9 | 21 | 20 | 32 |
| 35 | 35 | 0 | 9 | 21 | 20 | 35 |

The "*" denotes experiments that are not representative of this invention, and are presented for comparison only.

EXAMPLE 3

Dialkyl Carbonate Compositions

Various compositions were prepared containing the dialkyl carbonates dimethyl carbonate (DMC) and diethyl carbonate (DEC), as indicated in Table 3. In Table 3, the values for benzyl alcohol (BA), propylene carbonate (PC), propylene glycol n-butyl ether (PNB), and dipropylene glycol n-butyl ether (DPNB) are based on weight percentages. For some of the compositions in Table 3 denoted with a "†" in the Miscible column, a glycol ether was needed to form a miscible composition. As in Example 1, the compositions were applied to a standard panel having paint and coatings for military use (obtained from Scientific Material International, Inc., Lot 96046-A2 4"×5", MIL-P-2337 primer, MIL-S-81733 Type 3 polysulfide sealant, MIL-C-83286). The dialkyl carbonate compositions were surprisingly effective in removing the paint and coatings. In Table 3, the runs in which the composition was not miscible are not representative of the invention, and are presented for purposes of comparison only.

The compositions have several important attributes, including low toxicity, high efficacy in removing paint and coatings, and neutral pH (or slightly acidic or slightly basic pH). In addition, the compositions of this invention cause blistering and bubbling in such a short period of time that it is envisioned that the compositions of this invention can be applied in liquid form, as opposed to the gels which are commonly applied which lesson evaporation of the chlorinated hydrocarbons, for example. However, on difficult to remove coatings on vertical surfaces, thickeners such as Klucel H (Hercules, Aqualon Division) or Dow's Methocal® F4MPRG or Dow's Experimental polymer XCS 41067.06 may be required to obtain effective coating removal.

TABLE 3

| DMC | DEC | PC | BA | PNB | DPNB | $H_2O_2$ | Water | Miscible | Minutes to Blister | Minutes to Bubble |
|---|---|---|---|---|---|---|---|---|---|---|
| 61.5 | 0 | 0 | 0 | 23.1 | 0 | 4.6 | 10.8 | Yes† | 20 | 30 |
| 0 | 53.3 | 0 | 0 | 0 | 33.3 | 4.0 | 9.3 | No* | N/A | N/A |
| 60 | 0 | 20 | 0 | 0 | 0 | 6.0 | 14.0 | Yes | 20 | 30 |
| 40 | 0 | 40 | 0 | 0 | 0 | 6.0 | 14.0 | Yes | 30 | 42 |
| 20 | 0 | 60 | 0 | 0 | 0 | 6.0 | 14.0 | Yes | 55 | 60 |
| 0 | 40.0 | 13.3 | 0 | 0 | 33.3 | 4.0 | 9.3 | No* | N/A | N/A |
| 0 | 27.6 | 27.6 | 0 | 0 | 31.0 | 4.1 | 9.6 | Yes† | 50 | 60 |
| 0 | 17.4 | 52.2 | 0 | 0 | 13.0 | 5.2 | 12.2 | Yes† | 40 | 45 |
| 50.0 | 0 | 0 | 16.7 | 16.7 | 0 | 5.0 | 11.6 | Yes† | 20 | 30 |
| 33.3 | 0 | 0 | 33.3 | 16.7 | 0 | 5.0 | 11.7 | Yes† | 25 | 30 |
| 16.0 | 0 | 0 | 48.0 | 20.0 | 0 | 4.8 | 11.2 | Yes† | 20 | 40 |
| 0 | 40.0 | 0 | 13.3 | 0 | 33.3 | 4.0 | 9.3 | No* | N/A | N/A |
| 0 | 26.7 | 0 | 26.7 | 0 | 33.3 | 4.0 | 9.3 | No* | N/A | N/A |
| 0 | 13.3 | 0 | 40.0 | 0 | 33.3 | 4.0 | 9.3 | Yes† | 35 | 55 |
| 30 | 0 | 30 | 20 | 0 | 0 | 6 | 14 | Yes | 20 | 40 |
| 20 | 0 | 20 | 40 | 0 | 0 | 6 | 14 | Yes | 25 | 40 |
| 8.3 | 0 | 8.3 | 50.0 | 16.7 | 0 | 5.0 | 11.7 | Yes† | 30 | 45 |
| 0 | 20.0 | 20.0 | 13.3 | 0 | 33.3 | 4.0 | 9.3 | Yes† | 45 | 60 |
| 0 | 13.3 | 13.3 | 26.7 | 0 | 33.3 | 4.0 | 9.3 | Yes† | 49 | 60 |
| 0 | 6.7 | 6.7 | 40.0 | 0 | 33.3 | 4.0 | 9.3 | Yes† | 49 | 60 |

The "*" denotes experiments that are not representative of this invention, and are presented for comparison only.

EXAMPLE 4

Stability of Propylene Carbonate Compositions

A number of compositions were prepared containing propylene carbonate (PC), water, hydrogen peroxide ($H_2O_2$), and varying amounts of stabilizer. The compositions were then placed in containers and periodically monitored to determine $H_2O_2$ content. The results are reported in Table 4.

TABLE 4

| Compo-sition | PC | Stabilizer | Amt Of Stabilizer | $H_2O_2$ | $H_2O$ | 2 wks | 4 wks | 6 wks | 8 wks | 10 wks | 12 wks |
|---|---|---|---|---|---|---|---|---|---|---|---|
| | Weight % of Compounds in Original Solution | | | | | $H_2O_2$ Concentration | | | | | |
| 4-A | 57.1 | None | — | 15.0 | 27.9 | 14.9 | 14.7 | 14.4 | 14.7 | 13.9 | 14.6 |
| 4-B | 61.5 | Benzoic Acid | 0.1 | 13.4 | 25.0 | | 13.5 | | 13.2 | 13.1 | 13.1 |
| 4-C | 57.1 | Benzoic Acid | 0.1 | 15.0 | 27.8 | 15.0 | 14.8 | 14.7 | 13.6 | 14.2 | 14.7 |
| 4-D | 57.1 | Benzoic Acid | 0.05 | 15.0 | 27.8 | 14.9 | 14.8 | 14.7 | 14.9 | 14.0 | 14.7 |
| 4-E | 57.1 | Benzoic Acid | 0.01 | 15.0 | 27.9 | 14.8 | 14.8 | 14.7 | 14.5 | 12.8 | 14.6 |
| 4-F | 57.1 | DeQuest ™ 2010 | 0.1 | 15.0 | 27.8 | 14.9 | 14.9 | 15.0 | 14.7 | 14.4 | 14.9 |
| 4-G | 57.1 | DeQuest ™ 2010 | 0.05 | 15.0 | 27.8 | 14.9 | 14.9 | 14.7 | 14.1 | 14.6 | 12.6 |
| 4-H | 57.1 | DeQuest ™ 2010 | 0.01 | 15.0 | 27.9 | 14.9 | 15.0 | 14.8 | 14.8 | 14.2 | 14.6 |

The data in Table 4 shows that, surprisingly, carbonate/water/$H_2O_2$ compositions are stable. Thus, the hydrogen peroxide does not decrease in amount to any appreciable degree over a 12 week span. Furthermore, it was found that, unexpectedly, the compositions were single phase despite high $H_2O$ loadings of 25 percent or more. This is particularly notable because water and propylene carbonate are only partially miscible. At the loadings in the examples in Table 4, phase separation occurs in the absence of hydrogen peroxide. While not wishing to be bound by theory, it is contemplated that the hydrogen peroxide functions as a coupler to provide a single phase solution. The data in Table 4 also appears to suggest that use of a stabilizer is not particularly important to maintain a stable composition and, as such, is optionally employed in the practice of this invention. It is thus notable that compositions having 15 percent or more peroxide are stable.

The fluctuations in concentration in Table 4 (i.e., an increase in peroxide) are attributable to normal experimental error.

EXAMPLE 5

Thickened Compositions

A number of carbonate compositions were prepared by mixing components with stirring. Various thickeners were included in the compositions. The compositions are described in Table 5-A. In Table 5-A, "a" denotes methyl cellulose (Dow Chemical's Methocell™ 311), "b" denotes hydroxy propyl cellulose (Klucel™ H cellulose from Aqualon), and "c" denotes hydroxy propyl methyl cellulose (Methocell™ F4MPRG by Dow Chemical).

TABLE 5-A

| Composition | Benzyl Alcohol | PC | $H_2O_2$ | $H_2O$ | Thickener |
|---|---|---|---|---|---|
| 5-A | 48.0 | 32.0 | 6.3 | 11.7 | 2.0b |
| 5-B | 46.60 | 31.00 | 7.00 | 13.00 | 2.40b |

TABLE 5-A-continued

| Composition | Benzyl Alcohol | PC | $H_2O_2$ | $H_2O$ | Thickener |
|---|---|---|---|---|---|
| 5-C | 45.60 | 30.40 | 7.00 | 13.00 | 4.00b |
| 5-D | 46.32 | 30.88 | 7.00 | 13.00 | 2.80a |
| 5-E | 46.46 | 30.97 | 7.09 | 13.18 | 2.30a |
| 5-F | 46.32 | 30.88 | 7.00 | 13.00 | 2.80c |
| 5-G | 46.46 | 30.97 | 7.09 | 13.18 | 2.30c |
| 5-H | 46.46 | 30.97 | 7.09 | 13.18 | 2.30b |
| 5-I | 46.32 | 30.88 | 7.00 | 13.00 | 2.80b |
| 5-J | 46.6 | 31.1 | 7.0 | 13.0 | 2.3b |
| 5-K | 46.5 | 31.0 | 7.0 | 13.0 | 2.5b |
| 5-L | 46.4 | 30.9 | 7.0 | 13.0 | 2.7b |
| 5-M | 46.3 | 30.8 | 7.0 | 13.0 | 2.9b |
| 5-N | 46.6 | 31.1 | 7.0 | 13.0 | 2.3c |
| 5-O | 46.5 | 31.0 | 7.0 | 13.0 | 2.5c |
| 5-P | 46.4 | 30.9 | 7.0 | 13.0 | 2.7c |
| 5-Q | 46.3 | 30.8 | 7.0 | 13.0 | 2.9c |
| 5-R | 46.7 | 31.2 | 7.0 | 13.0 | 2.1b |
| 5-S | 46.9 | 31.2 | 7.0 | 13.0 | 1.9b |
| 5-T | 47.0 | 31.3 | 7.0 | 13.0 | 1.7b |
| 5-U | 47.1 | 31.4 | 7.0 | 13.0 | 1.5b |

All of compositions 5-A through 5-U were single phase. The compositions were then placed in closed vessels and monitored for both viscosity stability and $H_2O_2$ stability. The results of these tests are shown in Table 5-B. "N/A" denotes that no data was collected for the given entry.

EXAMPLE 6

Thickened Compositions Using PVP

A number of carbonate compositions were prepared by mixing components with stirring. The thickener employed was PVP.

TABLE 6-A

| Composition | Room Temperature Viscosity cps | | | | | | H2O2 Concentration, Weight % | | | | | |
|---|---|---|---|---|---|---|---|---|---|---|---|---|
| | 2 wks | 4 wks | 8 wks | 12–14 wks | 16 wks | 20–21 wks | 2 wks | 4 wks | 8 wks | 12–14 wks | 16 wks | 20–21 wks |
| 6-A | N/A | N/A | 2560 | 1930 | 2260 | 1740 | 6.2 | 6.3 | 6.2 | 6.2 | 5.9 | 5.9 |
| 6-B | 3720 | 2740 | 2860 | 1960 | 1610 | N/A | 6.6 | 7.1 | 7.0 | 6.8 | 6.8 | N/A |
| 6-C | 18000 | 12160 | 9440 | 5200 | 4380 | N/A | 7.2 | 6.9 | 7.1 | 7.0 | 7.0 | N/A |
| 6-D | 416 | 97 | N/A | 96 | 64 | N/A | 6.3 | 6.5 | 6.4 | 6.4 | 5.9 | N/A |
| 6-E | 220 | 55 | N/A | 78 | 58 | N/A | 6.6 | 6.6 | 6.4 | 6.3 | 6.3 | N/A |
| 6-F | 40400 | 21280 | 16080 | 13300 | 8640 | N/A | 7.0 | 6.9 | 6.4 | 6.8 | 6.8 | N/A |
| 6-G | 17120 | 13900 | 8400 | 4500 | 4400 | N/A | 5.5 | 6.7 | 7.0 | 6.7 | 6.8 | N/A |
| 6-H | 4880 | 5080 | 4520 | 2800 | 3280 | N/A | 7.1 | 7.1 | 6.5 | 6.5 | 6.9 | N/A |
| 6-I | 8320 | 7640 | 7680 | 6760 | 6400 | N/A | 7.1 | 7.1 | 7.1 | 7.1 | 7.0 | N/A |
| 6-J | 1380 | 1155 | 972 | N/A | N/A | N/A | 6.0 | 7.0 | 6.2 | N/A | N/A | N/A |
| 6-K | 1090 | 528 | 272 | N/A | N/A | N/A | 6.8 | 6.7 | 2.4 | N/A | N/A | N/A |
| 6-L | 59 | 32 | 23 | N/A | N/A | N/A | 6.0 | 5.8 | 5.5 | N/A | N/A | N/A |
| 6-M | 24 | 20 | 15 | N/A | N/A | N/A | 5.2 | 4.3 | 3.9 | N/A | N/A | N/A |
| 6-N | 15600 | 4280 | 2280 | N/A | N/A | N/A | 7.0 | 7.1 | 6.5 | N/A | N/A | N/A |
| 6-O | 2100 | 432 | 221 | N/A | N/A | N/A | 6.7 | 6.2 | 6.3 | N/A | N/A | N/A |
| 6-P | 6400 | 1380 | 650 | N/A | N/A | N/A | 6.9 | 6.8 | 6.5 | N/A | N/A | N/A |
| 6-Q | 46400 | 19000 | 11500 | N/A | N/A | N/A | 6.6 | 6.7 | 6.9 | N/A | N/A | N/A |
| 6-R | 28 | N/A | 27.2 | N/A | N/A | N/A | 6.1 | N/A | 5.7 | N/A | N/A | N/A |
| 6-S | 16 | N/A | 18.4 | N/A | N/A | N/A | 5.6 | N/A | 5.0 | N/A | N/A | N/A |
| 6-T | 29 | N/A | 24.7 | N/A | N/A | N/A | 6.3 | N/A | 5.9 | N/A | N/A | N/A |
| 6-U | 33 | N/A | 26.8 | N/A | N/A | N/A | 6.6 | N/A | 6.2 | N/A | N/A | N/A |

The data in Table 6-A shows that the compositions of this invention that optionally contain a thickener are stable. It can be seen that efficacy of the thickener may vary depending on type of thickening agent. It can also be seen that in some instances (i.e., 6-R through 6-U) that the amount of thickening agent needed to effect thickening will vary. Since in general viscosity decreases over time, in some instances it may be preferable to add the thickener immediately preceding application to a surface to be treaded.

Table 6-B provides additional data on the thickened compositions that contain "METHOCEL OS," which is a hydroethyl cellulose obtained from The Dow Chemical Company. All the samples contained 160 grams of 35% $H_2O_2$ in water. Compositions 5-V through 5-Z contained 1%, 1.25%, 1.5%, 1.75% and 2% of the thickener, respectively.

TABLE 6-B

| Composition | 50/50 BA/PL (grams) | Thickener (grams) | Initial Viscosity | Initial 2 wk $H_2O_2$ Viscosity | 2 wk $H_2O_2$ (%) | 4 wk Viscosity | 4 wk $H_2O_2$ (%) | 12 wk Viscosity | 12 wk $H_2O_2$ (%) |
|---|---|---|---|---|---|---|---|---|---|
| 6-V | 632 | 8 | 11,578 | 7.0 | 80,583† | 6.9 | 1,888 | 6.9 | 449.9 | 6.8 |
| 6-W | 630 | 10 | 28,994 | 6.9 | 7,618 | 6.9 | 3,787 | 6.7 | 764.8 | 6.7 |
| 6-X | 628 | 12 | 130,000 | 7 | 14,777 | 7 | 15,377 | 6.6 | 2052 | 6.7 |
| 6-Y | 626 | 14 | 157,000 | 6.9 | 17,416 | 6.9 | 18,556 | 6.9 | 2949 | 6.8 |
| 6-Z | 624 | 16 | 275,000 | 7 | 35,442 | 7 | 32,073 | 6.6 | 5169 | 6.8 |

*This viscosity data is in centipoise at 25° C.

TABLE 6-C

| 35% $H_2O_2$ in $H_2O$ | 50/50 BA/PC | Thickener | Thickener Amt | Observations |
|---|---|---|---|---|
| 160 | 632 | NOPCO DSX 1550 | 17.4 (8 + 9.4) | Clear |
| 160 | 632 | HYDROPLAT 535 | (8 + 8) 16 | Cloudy |
| 160 | 632 | BERMOWELL EBS 481 | 8 | Two phases |
| 160 | 632 | GARBOSA P 200 G | 8 | Flocculated |

TABLE 6-C-continued

| 35% $H_2O_2$ in $H_2O$ | 50/50 BA/PC | Thickener | Thickener Amt | Observations |
|---|---|---|---|---|
| 160 | 632 | AKUCELL AF 2785 | 8 | Flocculated |
| 160 | 632 | CELLOSIZE QP-52000 | 8 | Flocculated |
| 160 | 632 | THICKET | 8 | Flocculated |
| 160 | 632 | Gum Guar | 8 | Flocculated |
| 160 | 632 | Gum Xanthan | 8 | Flocculated |
| 160 | 632 | Acacia | 8 | Two phase |
| 160 | 632 | Gum Guar 2-hydroxypropyl-ether | 8 | Flocculated |
| 160 | 632 | PVP | 40 (8 + 32) | Clear |

The data in Table 6-C demonstrates that certain thickeners are far more effective than others for the propylene carbonate/peroxide compositions of this invention. Specifically, several of the common thickeners do not provide a thickened composition due to flocculation or phase separation.

In Table 6-C, the PVP was obtained from Aldrich and had a molecular weight of 1,300,000 "HYDROPLAT 535" and "NOPCO DSX 1550" are thickeners sold by Henkel. "BERMOCOLL SPS 481" is an ethyl hydroxyethyl cellulose obtained from Akzo. "GARBOSA P 200" is a sodium carboxymethyl cellulose obtained from Akzo. "AKUCELL AF 2785" is a sodium carboxymethylcellulose obtained from Akzo. "CELLOSIZE QP-52000" hydroxyethyl cellulose obtained from Union Carbide. "THICKIT" is a dietary, starch-based thickener used in the medical field.

In Table 6-D, viscosity data is provided for compositions with varying amounts of PVP. In each run, the composition contained 160 grams of 35% aqueous hydrogen peroxide. The amounts of PVP corresponds to 5%, 10%, 15% and 20% samples.

TABLE 6-D

| Amt of 50/50 BA/PC in grams | Amt of PVP in grams | Initial Viscosity (CP at 25° C.) | Viscosity after 2 wks (CP at 25° C.) | Initial $H_2O_2$ (%) | $H_2O_2$ % After 2 wks |
|---|---|---|---|---|---|
| 600 | 40 | 85.5 | 80 | 6.9 | 6.9 |
| 560 | 80 | 272 | 564 | 7.0 | 6.7 |
| 520 | 120 | 2619 | 2799 | 7.1 | 7.0 |
| 480 | 160 | 9498 | 10,798 | 7.0 | 6.5 |

The data in Table 6-D demonstrates that the PVP-thickened compositions are stable for both $H_2O_2$ and thickener. Thus, the $H_2O_2$ did not break down the thickener to an appreciable degree.

TABLE 6-E

| Composition | Amt of 35% $H_2O_2$ (grams) | Amt of 50/50 BA/PC (grams) | Thickener | Amt of thickener (grams) |
|---|---|---|---|---|
| 6-A | 86.6 | 281.4 | PVP | 65 |
| 6-B | 100 | 370 | PVP K-80 | 30 |
| 6-C | 100 | 373 | PVP K-90 | 27 |
| 6-D | 100 | 388.75 | PVP K-120 | 11.25 |
| 6-E | 100 | 377.5 | PVP K-90 | 22.5 |
| 6-F | 100 | 375 | STABILEZE 06 | 25.0 |
| 6-G | 86.6 | 281.4 | PVP K-120 | 28.8 |
| 6-H | 80 | 318 | STABILEZE 06 | 10 |
| 6-I | 80 | 312 | STABILEZE 06 | 8 |

Tables 6-F and 6-G provide stability data for compositions of Table 6-E. The compositions employ a variety of PVP thickeners. In Table 6-E, the viscosity data is in centipose at 25° C. In Table 6-E, the STABILEZE 06 material is not intended to be an example of a PVP-thickened composition of this invention.

In Table 6-E, the thickeners may be described as follows:

"PVP" is product obtained from Aldrich having a 1.3 million molecular weight,

"PVP K-80" is a product obtained from BASF having a molecular weight of 900,000, "PVP K-90" is a produce obtained from ISP having a molecular weight of 900,000 to 1,500,000, "PVP K-120" is a product obtained from ISP having a molecular weight of 2,200,000 to 2,800,000, "STABILEZE 06" is a methyl vinyl ether/maleic anhydride copolymer crosslinked with 1,9-decene, obtained from ISP. The STABILEZE 06 material is not intended to be an example of a PVP-thickened composition of this invention.

TABLE 6-F

| Composition | Initial $H_2O_2$ % | 2 wk $H_2O_2$ % | 7 wk $H_2O_2$ % | 12 wk $H_2O_2$ % | 22 wk $H_2O_2$ % |
|---|---|---|---|---|---|
| 6-A | 4.9 | 6.7 | 7 | 6.8 | 6.6 |
| 6-B | 6.9 | — | — | — | — |
| 6-C | 6.9 | — | — | — | — |
| 6-D | 7 | — | — | — | — |
| 6-E | 72 | — | — | — | — |
| 6-F | N/A* | N/A* | N/A* | N/A* | N/A* |
| 6-G | 7.3 | 7.62 | 7.4 | 7.5 | 7.4 |
| 6-H | 6.7 | 6.42 | — | — | — |
| 6-I | 6.9 | 6.69 | — | — | — |

*Since this composition solidified, $H_2O_2$ % was not measured.

TABLE 6-G

| Composition | Initial Viscosity | 2 wk Viscosity | 7 wk Viscosity | 12 wk Viscosity | 22 wk Viscosity |
|---|---|---|---|---|---|
| 6-A | 2784 | 2477 | 2192 | 1920 | 1545 |
| 6-B | 136.8 | — | — | — | — |
| 6-C | 259.9 | — | — | — | — |
| 6-D | 57.2 | — | — | — | — |
| 6-E | 104.6 | — | — | — | — |
| 6-F | SOLID | n/a | n/a | n/a | n/a |
| 6-G | 1352 | 1250 | 1092 | 963.8 | 844.4 |
| 6-H | 53 | 6.8 | — | — | — |
| 6-I | 158.6 | 6.8 | — | — | — |

In Tables 6-F and 6-G, the "-" notations are points at which the viscosity became too low for practical purposes, and the test was stopped.

EXAMPLE 7

Organic Carbonate Based Paint Strippers Containing Soy and/or Naphthene

This examples illustrates the advantages derived from including soy and/or naphthene in compositions containing organic carbonate (propylene carbonate), water, and hydrogen peroxide. Several compositions (7A–7L) were prepared by mixing the components stated in Table 7A.

TABLE 7A

Paint Stripping Compositions 7A-7L

| Composition | PC | BA | Bleached Soy Oil | Bleached Soy Methyl Ester | Naphthene | Water | $H_2O_2$ |
|---|---|---|---|---|---|---|---|
| 7A | 41.60 | 41.60 | 0 | 3.25 | 0 | 27.10 | 27.10 |
| 7B | 42.93 | 42.93 | 0.15 | 0 | 0 | 7 | 7 |
| 7C | 42.4 | 42.4 | 0 | 0 | 1.4 | 6.9 | 6.9 |
| 7D | 39.41 | 39.41 | 0 | 1.48 | 0 | 12.8 | 6.99 |
| 7E | 39.92 | 39.92 | 0.19 | 0 | 0 | 12.98 | 6.99 |
| 7F | 39.35 | 39.35 | 0 | 0 | 1.63 | 12.79 | 6.88 |
| 7G | 42.04 | 42.04 | 0 | 1.11 | 1.11 | 6.85 | 6.85 |
| 7H | 42.84 | 42.84 | 0.18 | 0 | 0.18 | 6.98 | 6.98 |
| 7I | 39.43 | 39.43 | 0 | 0.71 | 0.71 | 12.82 | 6.9 |
| 7J | 39.94 | 39.94 | 0.07 | 0 | 0.07 | 12.99 | 6.99 |
| 7K | 43 | 43 | 0 | 0 | 0 | 7.00 | 7.00 |
| 7L | 40 | 40 | 0 | 0 | 0 | 12.99 | 6.99 |

Compositions 7A–7L were employed in paint stripping tests on aircraft paints (Table 7B) and household paints (Table 7C). The tests were conducted according to procedure in Example 1. In Table 7B, run A employed a panel which used an MIL-P-23337 primer, an MIL-S-81733 Type 3 polysulfide sealant, and an MIL-C-85285 topcoat. In run B, the panel had a wash primer which was a MIL-C-8514 primer, a LAC PRIM MIL-P-7962 sealant, and a LAC TOP COAT TT-L-32A. In run C, the panel had an a.(1).ASM4049 system (Boeing paint softening test) which included a BSM 1079 Type II primer and a BSM 10-60 Type II enamel. Run D employed a panel having a BSM 10-79 Type III primer and a BSM 10-100 enamel. Run E employed a panel having a MIL-P-23377 primer, a MIL-C-2275 sealant, and an epoxy top coat.

TABLE 7B

Aircraft Paint Stripping

| Compo-sition | Minutes until the paint blistered | | | | |
|---|---|---|---|---|---|
| | Run A | Run B | Run C | Run D | Run E |
| 7A | 13.03 | 0.87 | 354 | 12.85 | 18.72 |
| 7B | 13.33 | 1.18 | 320 | 13.2 | 28.03 |
| 7C | 14.8 | 1.22 | 217 | 12.13 | 30.3 |
| 7D | 17.03 | 1.5 | 219 | 13.25 | 21.08 |
| 7E | 15.43 | 1.43 | 259 | 13.44 | 21.2 |
| 7F | 11.93 | 0.88 | 210 | 0.49 | 20.55 |
| 7G | 16.6 | 0.43 | 147 | 14.12 | 18.37 |
| 7H | 9.52 | 1.25 | 337 | 0.38 | 21.83 |
| 7I | 15.83 | 1.13 | 191 | 14.44 | 23.6 |
| 7J | 10.47 | 0.68 | 195 | 15.2 | 24.47 |
| 7K | 19.97 | 1.75 | 125.5 | 7.18 | 18.25 |
| 7L | 20.28 | 2.08 | 126.7 | 5.32 | 20.72 |

From this data it can be seen that for these panels with paint coatings, the relative overall effectiveness of compositions 7A–7L is as follows: 7F>7H>7G>7A>7K>7J>7L>7I>7B>7E>7D. These compositions compared favorably to several commercial paint strippers including Terco 6831, Terco 6776, Bix Tuff-Job Remover (Toluene, MeCl), Parks (Toluene/acetone/hexane/IPA/butylacetate/ethyl-3-ethoxypropionate), Stripeeze (NMP/DBE/limonene), and Strip X (MeCl/toluene/acetone/methanol/nonylphenoxy-polyethoxyethanol), the data for which is presented in the following table.

TABLE 7B

Comparative
Comparative Data
Aircraft Paint Stripping

| Composition | Minutes until the paint blistered | | | | |
|---|---|---|---|---|---|
| | Run A | Run B | Run C | Run D | Run E |
| Terco 6831 | 34.83 | 2.8 | 110.72 | 12.57 | 26.67 |
| Terco 6776 | 21.03 | 2.83 | 29.23 | 2.35 | 6.87 |
| Bix Tuff-Job Remover | 36.32 | 1.58 | 28.82 | 1.56 | 2.03 |
| Parks | dried | 1.33 | dried | 6.48 | Dried |
| Stripeze | 35.87 | 1.37 | <6 hours | 1.48 | 21.97 |
| Strip X | 4.5 | 1.27 | 23.02 | 1.01 | 2.32 |

It can be seen that in some cases the compositions of this invention which contain activators provide surprisingly superior paint removing properties. In general, the alkyl-substituted cyclo-alkane (naphthene) activators provide superior activating properties. In addition, these compositions may include possible corrosion inhibition, particularly those containing soy based solvents.

Compositions 7A–7L were then tested on some household paints. The tests were conducted according to procedure in Example 1. In Table 7C, run A employed a varnished hardwood panel. In run B, the wood panel was painted with latex. In run C, the panel was a latex enamel on wood. Run D employed a panel with an acrylic enamel on metal. Run E employed a panel having a latex enamel on metal. Run F employed a panel having one coat of an acrylic lacquer primer and two coats of an acrylic lacquer finish.

TABLE 7B

Household Paint Stripping

| Compo-sition | Minutes until the paint blistered | | | | | |
|---|---|---|---|---|---|---|
| | Run A | Run B | Run C | Run D | Run E | Run F |
| 7A | 11.48 | 1.52 | 1.13 | 2.23 | 1.93 | 14.18 |
| 7B | 13.23 | 1.98 | 1.08 | 2.73 | 3.68 | 12.98 |
| 7C | 13.47 | 2.27 | 1.97 | 3.37 | 2.17 | 18.83 |
| 7D | 14.32 | 2.8 | 2.22 | 15.18 | 3.48 | 13.3 |
| 7E | 9.25 | 3.33 | 2.9 | 5.08 | 2.02 | 21.3 |
| 7F | 9.3 | 2.97 | 0.82 | 9.05 | 2.05 | 21.3 |
| 7G | 15.15 | 1.8 | 1.45 | 9.75 | 2.45 | 6.13 |
| 7H | 16.3 | 0.97 | 1.82 | 6.47 | 2.82 | 16.87 |
| 7I | 16.17 | 2.45 | 1.72 | 14.1 | 2.85 | 13.83 |
| 7J | 8.25 | 2.47 | 1.68 | 11.88 | 2.18 | 6.35 |
| 7K | 16.03 | 1.97 | 2.98 | 5.83 | 3.02 | 45.17 |
| 7L | 15.58 | 1.83 | 2.88 | 4.8 | 1.73 | 34.85 |

From this data it can be seen that for these panels with paint coatings, the relative overall effectiveness of compositions 7A–7L is as follows: 7A>7J>7B>7G>7F>7H>7C>7L>7E 7I>7D>7K. These compositions again compared favorably to several commercial paint strippers including Terco 6831, Terco 6776, Bix Tuff-Job Remover, Parks, Stripeze, and Strip X, the data for which is presented in the following table. It may be appreciated that based on the data in these tables, that the soy based activators are favorable for home use as opposed to the more cross-linked aerospace coatings as employed in the examples shown in Table 7B.

TABLE 7C

Comparative
Comparative Data
Household Paint Stripping

| Composition | Minutes until the paint blistered | | | | | |
|---|---|---|---|---|---|---|
| | Run A | Run B | Run C | Run D | Run E | Run F |
| Terco 6831 | 10.17 | 2.1 | 1.02 | 2.83 | 2.27 | 35.93 |
| Terco 6776 | 9.05 | 2.1 | 1.03 | 4.26 | 2.43 | 21.22 |
| Bix | 2.65 | 0.88 | 1.2 | 0.78 | 1.1 | 0.65 |
| Parks | dried up | 0.68 | 0.78 | 5.4 | 1.3 | 35.75 |
| Stripeze | 10.33 | 1.28 | 0.97 | 2.02 | 0.87 | 3.07 |
| Strip X | 2.85 | 1.02 | 1.15 | 1.63 | 1.37 | 2.50 |

Further modifications and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms of the invention herein shown and described are to be taken as illustrative embodiments. Equivalent elements or materials may be substituted for those illustrated and described herein, and certain features of the invention may be utilized independently of the use of other features, all as would be apparent to one skilled in the art after having the benefit of this description of the invention.

What is claimed is:

1. A process for removing paint, comprising: applying a composition a painted surface for a time and under conditions effective to cause blistering or bubbling of the paint, wherein the composition comprises effective amounts of an organic carbonate, an activator, an alcohol, hydrogen peroxide, and water, wherein the activator is an alkyl-substituted cycloalkane, a soy oil, an alkyl soyate, or combination thereof.

2. The process of claim 1, wherein the composition includes an alcohol.

3. The process of claim 1, wherein the organic carbonate is propylene carbonate, ethylene carbonate, or combination thereof.

4. The process of claim 1, wherein the activator is an alkyl-substituted cycloalkane.

5. The process of claim 1, wherein the activator is a soy oil.

6. The process of claim 1, wherein the activator is an alkyl soyate.

7. The process of claim 1, wherein the composition contains from about 10 to about 90 percent by weight of the organic carbonate, from about 0.1 to about 50 percent by weight of the alcohol, from about 0.1 to about 50 percent by weight of the activator, from about 0.1 to about 20 percent by weight of the hydrogen peroxide, and from about 0.1 to about 30 percent of the water.

8. The process of claim 1, further comprising an organic cosolvent.

9. The process of claim 1, further comprising a thickener.

10. The process of claim 1, further comprising a polyvinyl pyrrolidone thickener.

11. The process of claim 1, wherein the hydrogen peroxide is present in an amount in the range from about 3 to about 8 percent by weight.

12. The process of claim 1, wherein the alcohol is benzyl alcohol.

13. The process of claim 1, wherein the organic carbonate is present in an amount of from about 0.1 to about 90 percent by weight.

* * * * *